United States Patent
Shoji et al.

(10) Patent No.: US 6,541,152 B1
(45) Date of Patent: Apr. 1, 2003

(54) CYLINDRICAL BATTERY AND METHOD AND DEVICE FOR MANUFACTURING THEREOF

(75) Inventors: Yasuhiko Shoji, Higashiosaka (JP); Seiji Wada, Katano (JP); Shigeto Noya, Neyagawa (JP); Tadahiro Sawada, Neyagawa (JP); Takayuki Aoi, Hirakata (JP); Minoru Koda, Hirakata (JP); Saburo Nakatsuka, Kyoto (JP); Tsutomu Moriwaki, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/700,565
(22) PCT Filed: May 20, 1999
(86) PCT No.: PCT/JP99/02675
§ 371 (c)(1), (2), (4) Date: Nov. 30, 2000
(87) PCT Pub. No.: WO99/60636
PCT Pub. Date: Nov. 25, 1999

(30) Foreign Application Priority Data

May 21, 1998 (JP) ............................. 10-139350
May 21, 1998 (JP) ............................. 10-139351

(51) Int. Cl.[7] ............................................. H01M 2/18
(52) U.S. Cl. ..................... 429/142; 429/129; 429/140; 429/145; 429/133; 429/247; 29/623.1
(58) Field of Search ..................... 429/129, 142, 429/133, 140, 145, 247; 29/623.1

(56) References Cited

U.S. PATENT DOCUMENTS

| 3,829,952 | A |   | 8/1974 | Trask |         |
|-----------|---|---|--------|-------|---------|
| 4,216,322 | A |   | 8/1980 | Temme |         |
| 5,030,525 | A | * | 7/1991 | Hisatomi et al. | 429/101 |
| 5,272,020 | A |   | 12/1993 | Flack |         |
| 5,300,371 | A |   | 4/1994 | Tomantschger et al. |   |
| 5,672,443 | A |   | 9/1997 | Salisbury et al. |       |
| 6,099,987 | A | * | 8/2000 | Daniel-Ivad et al. | 429/141 |

FOREIGN PATENT DOCUMENTS

| EP | 0 684 620  | 11/1995 |
|----|------------|---------|
| JP | 49-68254   | 7/1974  |
| JP | 52-40025   | 3/1977  |
| JP | 54-9704    | 4/1979  |
| JP | 61-203628  | 9/1986  |
| JP | 61-204927  | 9/1986  |

(List continued on next page.)

OTHER PUBLICATIONS

Patent Abstracts of Japan, vol. 16, No. 582 (E–1300) (Dec. 1992) and JP 04 233211 A (Murata Mfg. Co. Ltd.) (Aug. 1992).

Patent Abstracts of Japan, vol. 16, No. 582 (E–1300) (Dec. 1992) and JP 04 233210 A (Murata Mfg. Co. Ltd.) (Aug. 1992).

*Primary Examiner*—Patrick Ryan
*Assistant Examiner*—Angela J. Martin
(74) *Attorney, Agent, or Firm*—Jordan and Hamburg LLP

(57) ABSTRACT

In the process of manufacturing a cylindrical battery, when a tubular separator (3) and bottom separator (5) are inserted into a battery casing (1) in which are accommodated positive electrode mixture pellets (2), by inserting the bottom separator (5) such that it is pushed into the battery casing (1) at the leading end of the tubular separator (3), the peripheral portion of the bottom separator (5) is raised up, so that both separators (3,5) are inserted into the battery casing (1) in a condition with the leading end of the tubular separator (3) surrounded from the outside by this peripheral raised-up portion.

9 Claims, 7 Drawing Sheets

FOREIGN PATENT DOCUMENTS

| | | |
|---|---|---|
| JP | 61-211959 | 9/1986 |
| JP | 1-286413 | 11/1989 |
| JP | 05-182651 | 7/1993 |
| JP | 07-153442 | 6/1995 |
| JP | 09-045338 | 2/1997 |
| JP | 10-334878 | * 12/1998 ............ H01M/2/18 |
| RU | 2022926 | 11/1994 |
| WO | WO95/20231 | 7/1995 |
| WO | WO 97/17736 | 5/1997 |

* cited by examiner

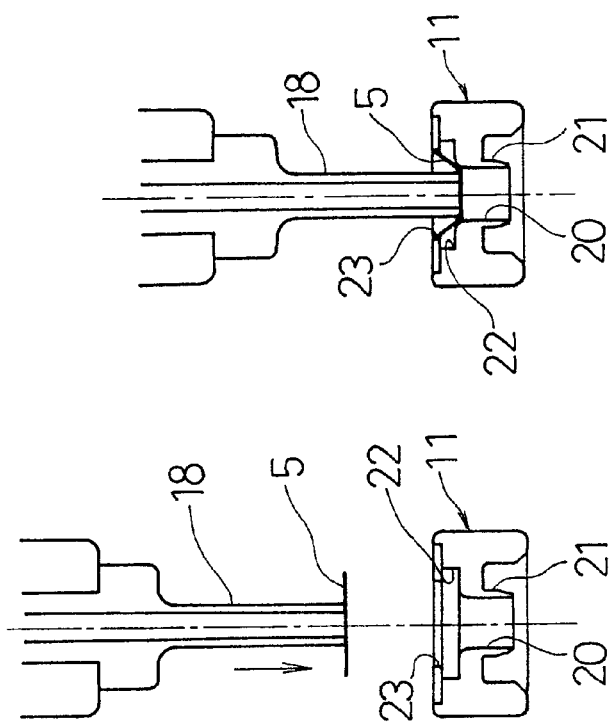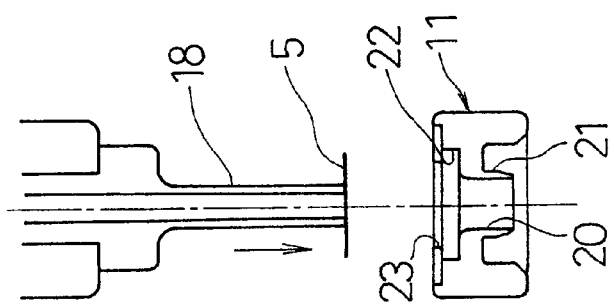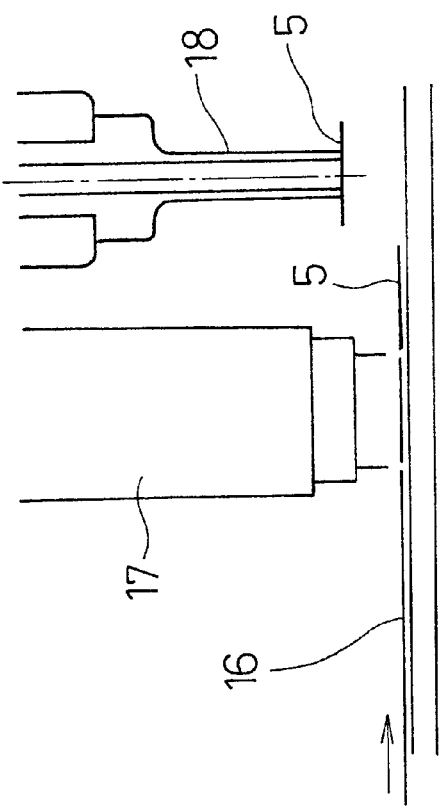

CYLINDRICAL BATTERY AND METHOD AND DEVICE FOR MANUFACTURING THEREOF

TECHNICAL FIELD

The present invention related to a cylindrical battery wherein discharge performance and reliability are enhanced by improving the mounting structure of the separator that seperates the positive electrode material and negative electrode material within the battery, and a method and device for manufacturing such a cylindrical battery.

BACKGROUND ART

FIG. 9 is a partially sectioned front view showing a prior art construction of an alkaline dry battery 30 as one example of a cylindrical battery. A battery casing 1 of cylindrical shape having a bottom is integrally provided with a positive electrode projection 6 constituting the positive electrode terminal of the battery, in the middle of its bottom face. This battery casing 1 accommodates positive electrode mixture pellets 2 and a negative electrode gel 4 in the interior thereof, with a tubular separator 35 interposed therebetween. The open end of battery casing 1 is sealed by a sealing plate 7 made of resin, a negative electrode terminal 8 connected to a negative electrode current collector 9 being mounted on this sealing plate 7. Tubular separator 35 is formed in cylindrical shape by winding separator paper into a roll, a portion at the bottom end thereof being folded inwards contacting the bottom face of the battery casing 1 and constituting a bottom part 35a. Since the middle portion of this bottom part 35a is open, a circular bottom separator 36 having a larger diameter than the internal diameter of tubular separator 35 is inserted within tubular separator 35 in order to cover this aperture portion and thereby prevent internal short circuits between negative electrode gel 4 and battery casing 1. Furthermore, a step 1a is provided in the bottom face of battery casing 1, to absorb even if only to a small extent, the thickness of the bottom part 35a of tubular separator 35 and bottom separator 36, so as to avoid, as far as possible, offset in the vertical direction of the reaction surfaces where the negative electrode gel 4 and positive electrode mixture pellets 2 face each other.

The mounting of tubular separator 35 and bottom separator 36 in the manufacturing step of this alkaline dry battery 30 is performed by a manufacturing device shown in FIGS. 10A–10D.

In FIG. 10A, a battery feed jig 15 holding a battery casing 1 is moved directly below a winding rod 33 of a tubular separator installation device 32, after positive electrode mixture pellets 2 have been accommodated in battery casing 1 in a previous step, not shown. The diameter of winding rod 33 below step 38 is formed smaller than the diameter thereabove by an amount corresponding to the thickness of tubular separator 35, and this winding rod is supported such as to be rotated in the forwards and reverse directions and can be raised and lowered. When separator paper, that has been cut to prescribed dimensions, is supplied to the gap between winding rod 33 and winding guides 34, winding rod 33 is rotated in the forwards direction, and the separator paper is wound about the portion of winding rod 33 lower than step 38. In this process, slackness in winding is avoided by pressing the separator paper on to winding rod 33 by means of winding rollers 37. In this way, a tubular separator 35 is formed on winding rod 33 as shown, by winding the separator paper about winding rod 33 a prescribed number of times.

Next, as shown in FIG. 10B, winding rollers 37 are retracted from winding rod 33, winding rod 33 is lowered, and battery feed jig 15 is raised, so that winding rod 33 with tubular separator 35 wound thereon is inserted into battery casing 1. At this point the tubular separator 35, when inserted into battery casing 1, is released from the restraint applied by winding guides 34, so it increases its winding radius by springing back of its own accord so that it is in tight contact with positive electrode mixture pellets 2. Since the tip of tubular separator 35 is wound in a hollow condition with no winding rod 33 at its center, tubular separator 35 is pressed by step 38 and thereby inserted into battery casing 1; furthermore, when it is pressed against the bottom face of battery casing 1, this tip is squeezed inwards. Then, by further pressure applied by the tip of winding rod 33, the bending produced by this squeezing is molded into a flat condition, forming bottom part 35a (see FIG. 9). After this, winding rod 33 is released from tubular separator 35 by backwards rotation and raised, while battery feed jig 15 is lowered, so that tubular separator 35 is left in a condition in which it is installed in battery casing 1.

Battery casing 1 with tubular separator 35 installed therein is then fed to the next step by battery feed jig 15 and, as shown in FIG. 10C, is moved below bottom separator installation device 39. Bottom separator installation device 39 is provided with an insertion rod 40 and insertion guide hole 41; when bottom separator 36 that has been cut to circular shape is supplied to above insertion guide hole 41, insertion rod 40 is lowered. Simultaneously, battery feed jig 15 is raised and the open end of battery casing 1 is brought into contact with a locating element 42 of bottom separator installation device 39. Since insertion guide hole 41 is formed of cylindrical shape of smaller diameter than the diameter of bottom separator 36, when bottom separator 36 is inserted into insertion guide hole 41 by insertion rod 40, the circumferential region of bottom separator 36 is raised, forming a flat-bottomed U-shape in cross-section. When insertion rod 40 is further lowered, as shown in FIG. 10D, bottom separator 36 is installed on bottom part 35a produced by squeezing in of the bottom end of tubular separator 35.

After undergoing the steps of insertion of tubular separator 35 and bottom separator 36, battery casing 1 is fed to the subsequent steps (not shown) to complete the alkaline dry battery 30.

However, the battery construction and its manufacturing steps in the prior art described above were subject to the following problems.

(1) The bottom end part of tubular separator 35 was squeezed inwards to form bottom part 35a and further, in order to block the aperture produced in the middle of bottom part 35a, this aperture portion was closed by placing on bottom part 35a a bottom separator 36. Because of this, since a double-layer structure is adopted in which, in addition to the folding-over produced by squeezing of the bottom part 35a, bottom separator 36 is overlaid thereon, the thickness of the separator portion is increased, resulting in the production of a step (offset in the axial direction) in the reaction surfaces of negative electrode gel 4 and positive electrode mixture pellets 2 that face each other through tubular separator 35. Even though, as described above, a step 1a is provided in the bottom face of battery casing 1, this is still insufficient to eliminate the step previously referred to. Furthermore, the discharge performance of the battery is lowered due to the diminution in capacity to receive the negative electrode gel.

(2) In addition to the overlapping in pleated form of the bottom part 35a produced by the squeezing of the bottom end part of tubular separator 35, due to the double-layer construction with bottom separator 36, a construction is produced in which the separator portion at the bottom of battery casing 1 is resistant to deformation. As a result, if the negative electrode gel 4 is caused to expand by over-discharging, since this expansion force cannot escape at the bottom, the internal pressure produced by the expansion acts on the sealing plate 7, risking failure of the thin part 7a provided in sealing plate 7. The purpose of the provision of this thin part 7a is, in the first place, to prevent bursting of the battery if the internal pressure rises abnormally due to mis-use such as mixing new and old batteries or inserting the wrong way round, and its failure due to expansion of negative electrode gel 4 produced by over-discharging must be avoided.

(3) Since bottom separator 36 is arranged in contact with negative electrode gel 4, which is liable to flow, it can easily be displaced by flow of negative electrode gel 4 if the battery is subjected to shock or vibration. Internal short-circuiting due to displacement of bottom separator 36 can therefore easily occur.

(4) In the step of inserting bottom separators 36 into battery casings 1 by means of bottom separator installation device 39, bottom separators 36 pre-cut to prescribed dimensions and arranged in a stack are supplied by being picked up, one at a time, by vacuum suction. With this method, thin bottom separators 36 cannot be employed, but, when the thickness of bottom separator 36 is large, discharge performance is adversely affected, as described in paragraph (1) above.

(5) Since tubular separator 35 and bottom separator 36 are installed in battery casing 1 in separate steps, the number of steps is increased and productivity lowered, and the size of the manufacturing equipment becomes large.

The present invention has been devised in order to solve the aforementioned problems of the prior art, its object being to provide a method of manufacturing and device therefor whereby a cylindrical battery of high battery performance and reliability can be manufactured in an efficient manner.

DISCLOSURE OF THE INVENTION

A cylindrical battery according to the present invention comprises: a battery casing formed in a cylindrical shape having a bottom and having a projection protruding outwards in the middle of the bottom face; positive electrode mixture pellets formed in cylindrical shape and accommodated in said battery casing; a tubular separator formed in cylindrical shape; negative electrode gel accommodated on an inner side of the positive electrode mixture pellets with said tubular separator interposed therebetween; a bottom separator arranged at the bottom face on the inside of said battery casing; and a sealing plate that seals the open end of said battery casing; wherein said bottom separator is formed in the form of a sheet of thickness less than that of said tubular separator and of dimensions larger than the diameter of tubular separator, being arranged such that a peripheral part thereof is raised at the outside of tubular separator, thereby isolating said negative electrode gel and the battery casing.

With a construction as described above, the capacity to receive the negative electrode gel is increased since the tubular separator is formed without squeezing-in in the inwards direction at its bottom end, and the bottom part of the negative electrode gel and the inner bottom face of the battery casing are separated merely by a thin bottom separator; also, the discharge performance of the battery is improved since the reaction area where the positive electrode mixture pellets and negative electrode gel face each other is increased. Also, since the thin bottom separator is easily deformed and a space formed by a recess in the bottom face of the battery casing is provided at the undersurface of the bottom separator, if the negative electrode gel swells up due to over-discharging etc., this expansion can be absorbed by deformation of the bottom separator towards the space of this recess. Consequently, liquid leakage from the internal pressure release port formed in the sealing plate caused by rise of internal pressure produced by swelling-up of the negative electrode gel can be prevented. Also, since the bottom end of the tubular separator is surrounded from the outside by the peripheral raised portion of the bottom separator, being in a condition sandwiched between the tubular separator and the positive electrode mixture pellets, even if large impacts or vibration are applied to the battery, there is no possibility of the bottom separator being shifted out of position, so leakage of negative electrode gel caused by displacement of the bottom separator from its position can be prevented and there is thus no possibility of internal short circuits arising.

With a cylindrical battery according to the present invention, the bottom separator that isolates the negative electrode gel and battery casing consists of a thin sheet of thickness 0.03 to 0.2 mm; thus, compared with the thick separator of double-layer construction used in the prior art, the accommodation capacity for the negative electrode gel is increased and the reaction area is also increased. Also, due to this thinness, the bottom separator can easily be deformed, so if the negative electrode gel swells up on over-discharging, it can deform towards the space constituted by the recess formed at the bottom face of the battery casing, thereby absorbing this expansion. If the thickness of the bottom separator is less than 0.03 mm, it is difficult to construct a uniform thin film and strength is lowered. On the other hand, if the thickness is greater than 0.2 mm, the effect of absorbing expansion by deformation is lowered, so a thickness within this range is appropriate.

Also, since the bottom separator in a cylindrical battery according to the present invention is formed using an ion-permeable sheet, even though its peripheral raised portion is interposed between the positive electrode mixture pellets and negative electrode gel, the reaction of these two is not impeded.

Also, since the bottom separator in a cylindrical battery according to the present invention is formed in rectangular shape, the loss involved in cutting it out from the paper stock can be eliminated and since no cutting-out waste is therefore produced, the time required to dispose of such waste can be eliminated.

In a method of manufacturing a cylindrical battery that is manufactured by inserting positive electrode mixture pellets formed in cylindrical shape into a cylindrical casing having a bottom, inserting a tubular separator so as to contact the inner circumferential surface of said positive electrode mixture pellets, inserting a bottom separator at the bottom face of battery casing, injecting a negative electrode gel into the central space enclosed by the two separators and, and sealing the open end of the battery casing by means of a sealing plate; according to the invention, said bottom separator is formed in the form of a sheet of dimensions larger than the diameter of the tubular separator and both separators are inserted simultaneously into the battery casing with the leading end of the tubular separator in contact with this bottom separator, thereby inserting both separators into the battery casing with the peripheral portion of the bottom separator raised so that the leading end of the tubular separator is surrounded from the outside by the raised portion at the periphery of said bottom separator.

With the method of manufacture described above, the tubular separator and bottom separator can be simultaneously inserted into the battery casing, so the steps of inserting both separators can be combined into one, enabling production efficiency to be raised. Also, since the bottom separator is inserted into the battery casing with the leading end of the tubular separator surrounded from outside by the peripheral raised portion of the bottom separator, even if the battery is subjected to impacts or vibration, the bottom separator cannot easily be displaced from its position. Furthermore, since the portion of the negative electrode gel nearest the bottom face is separated from the battery casing only by the bottom separator, the capacity for negative electrode gel is increased and no step is produced in the reaction face with the positive electrode mixture pellets, so discharge performance can be improved.

Also, in a device for manufacturing a cylindrical battery according to the present invention whereby a cylindrical battery is manufactured by inserting positive electrode mixture pellets formed into cylindrical shape into a cylindrical battery casing having a bottom, then inserting a tubular separator so as to contact the inside circumferential face of said positive electrode mixture pellets and inserting a bottom separator on to the bottom face of battery casing, and injecting a negative electrode gel into the central space enclosed by the separators, comprising: a separator insertion jig including a circular guide hole along whose central axis a tubular separator is passed, a cylindrical part which is below this guide hole and that can be inserted into the open end of battery casing, and a holding part that is above said guide hole, for holding the bottom separator; bottom separator supply means whereby a bottom separator cut to dimensions larger than the diameter of the tubular separator is supplied into the holding part of said separator insertion jig; and separator installation means having a winding rod and whereby a tubular separator is formed by winding separator paper on to this winding rod, and whereby this tubular separator is inserted into the battery casing through said guide hole together with the bottom separator held within the holding part of said separator insertion jig; the separator insertion jig to which the bottom separator has been supplied from said bottom separator supply means, the winding rod of the separator installation means on which a tubular separator has been formed, and the battery casing into which the positive electrode mixture pellets have been inserted are positionally located such that their respective central axes coincide with an identical line; the cylindrical part of the separator insertion jig is fitted onto the open end of the battery casing; and said separator insertion jig, winding rod, and battery casing are relatively moved such that the winding rod is inserted into the battery casing through said guide hole and is then once more returned to said positionally located condition, whereby the tubular separator and the bottom separator are simultaneously installed in the battery casing.

With the manufacturing device described above, the separator installation means holding a tubular separator which has been wound on to a winding rod, and the battery casing are respectively located in position above and below the separator insertion jig, which has a holding part, guide hole, and cylindrical part, and the open end of the battery casing is fitted on to the cylindrical part of the separator insertion jig; the winding rod of the separator installation means is then advanced into the battery casing through the holding part and guide hole of the separator insertion jig. Since the bottom separator is supplied beforehand into the holding part and the tubular separator on the winding rod pushes the bottom separator into the guide hole by means of its tip, the peripheral portion of the bottom separator is raised up and assumes a condition surrounding the tip of the tubular separator and, in this condition, both separators are simultaneously inserted into the battery casing. Since the tubular separator wound on to the winding rod is inserted into the battery casing from the guide hole of the separator insertion jig through its cylindrical part, its wound-up condition is not released until it is inserted into the battery casing i.e. the wound-up condition is only released, by its own spring-back effect, once it has been inserted into the battery casing. It then adheres tightly to the previously inserted positive electrode mixture pellets and is released from the winding rod. At this point, the tubular separator can easily be released by rotating the winding rod in the opposite direction to the winding direction. Installation of the two separators is thus simultaneously completed by raising the winding rod from which the tubular separator has been released and lowering the battery casing so that it is released from the cylindrical part of the separator insertion jig.

Since the bottom separator supply means in the manufacturing device described above transfers the bottom separator to the separator insertion jig holding it by vacuum suction immediately after this bottom separator has been cut off from the paper stock, it is possible to effect feed of bottom separators one at a time in a manner linked to the operation of the separator installation step. With the conventional method, in which bottom separators are cut out beforehand and kept in readiness, the small, light and thin bottom separators are difficult to handle and it is difficult to achieve reliable vacuum suction of one separator at a time from the stack of separators. However, with the present invention, by providing the bottom separator cutting-out device in the bottom separator supply means, the step of processing a small part which is difficult to handle can be eliminated.

Furthermore, the bottom separators in the manufacturing device described above are cut out into square shape from the paper stock, so they may be cut from tape-shaped paper stock of width equal to the length of one side of the square shape; in this way, cutting waste is not produced and loss of material is eliminated. Also, the cutting-out device itself can be constructed in a straightforward manner.

Furthermore, as the holding part of the separator insertion jig in the manufacturing device described above comprises an accommodating space formed in circular shape having an internal diameter about the same as the diagonal length of the square-shaped bottom separators, and an insertion hole having a diameter smaller than the diagonal length of the bottom separators and opening at the top of this accommodating space, when a square bottom separator is inserted into the accommodating space from the insertion hole, although the corner parts of the square shape are deformed, since the internal diameter of the circular accommodating space is formed approximately equal to the diagonal length of the square shape, when the bottom separator is inserted into the accommodating space, it returns to a flat condition, being automatically located in position such that the corner parts contact the inner circumferential surface of the accommodating space. Also, holding and positional location of a small, light and thin bottom separator can easily be achieved without its position being displaced by the effects of air currents and/or vibrations produced by movement of the separator insertion jig.

BRIEF DESCRIPTION OF THE DRAWINGS

FIGS. 5A–5C are partially sectioned diagrammatic side views showing the sequence of steps of bottom separator supply in a device for manufacturing the above battery;

BEST MODE FOR CARRYING OUT THE INVENTION

Figure 1:
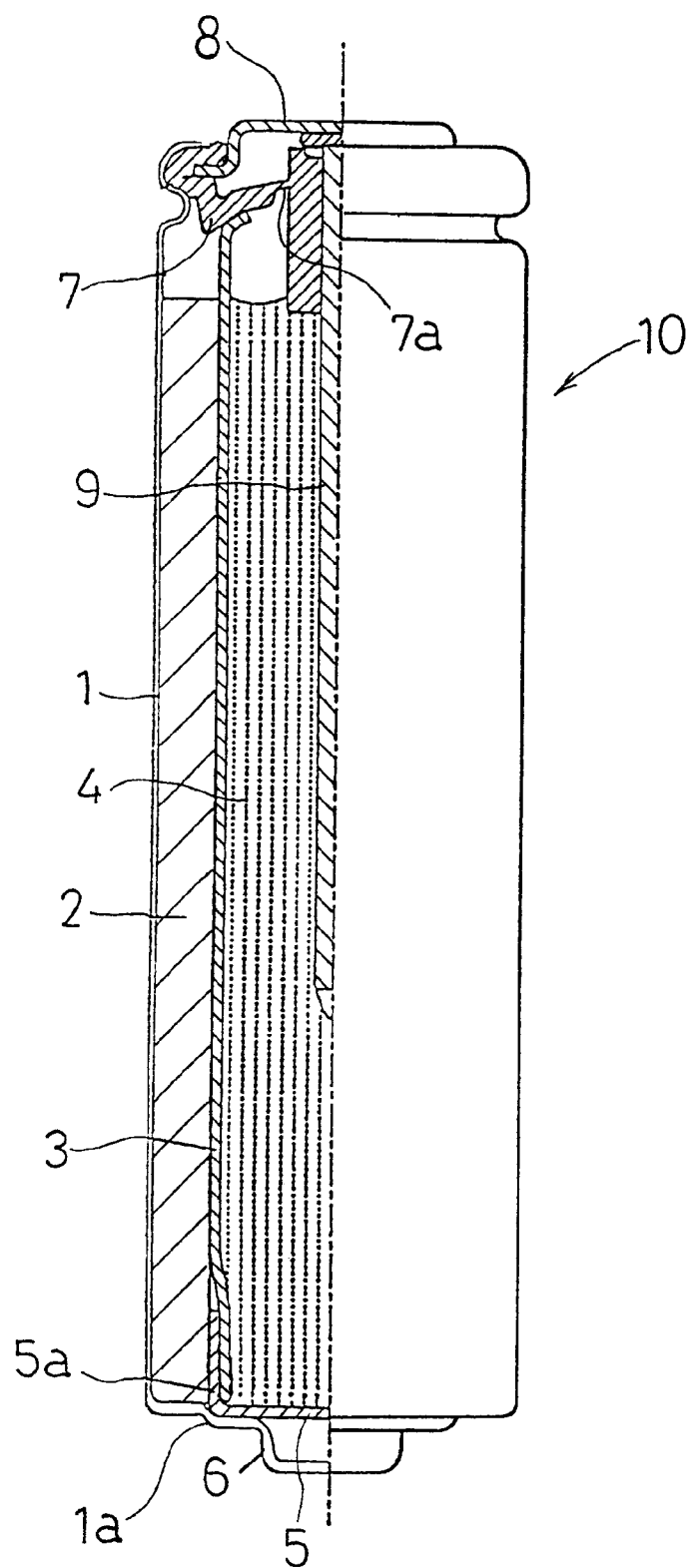
FIG. 1 is a partially sectioned front view showing the construction of an alkaline dry battery according to an embodiment of the present invention.
Figure 2:
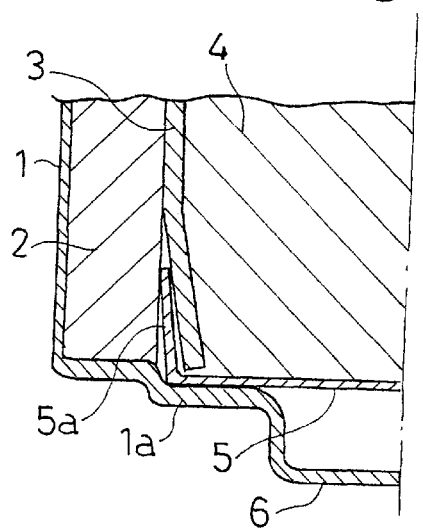
FIG. 2 is a partially sectioned view showing the condition in which the tubular separator and bottom separator are installed in this battery.

The construction of an alkaline dry battery (cylindrical battery) according to an embodiment of the present invention is described below with reference to FIG. 1 to FIG. 4. Elements which are common to the prior art construction are given the same reference numerals.

In FIG. 1, alkaline dry battery 10 in this embodiment is constituted by accommodating in battery casing 1, in order from the outside, positive electrode mixture pellets 2, tubular separator 3 and bottom separator 5, and negative electrode gel 4, the open end of battery casing 1 being sealed by sealing plate 7 and negative electrode terminal 8 being connected to negative electrode current collector 9 inserted into negative electrode gel 4. Battery casing 1 is of a type which is integral with the positive electrode terminal and is formed with a recess in the bottom face within the casing, which is of cylindrical shape having a bottom, such that a positive electrode projection 6 projects outwards. As shown to a larger scale in FIG. 2, bottom separator 5 which is arranged at the bottom of this alkaline dry battery 10 has a raised part 5a and, thanks to this raised part 5a, is constituted such as to enclose from outside the lower end of tubular separator 3 which is formed in cylindrical shape, and prevents internal short circuits by isolating negative electrode gel 4 and battery casing 1 constituting the positive electrode terminal of the battery.

Tubular separator 3 is formed in cylindrical shape by winding, so as to constitute four layers, separator paper made of chemical fiber non-woven cloth. In contrast, bottom separator 5 is formed using fine porous film that permits the passage of ions only. In this embodiment, a bottom separator 5 is employed produced by cutting into square shape separator paper of thickness 0.03 to 0.2 mm made by laminating non-woven cloth on to both sides of cellophane, the length of one side of which is greater than the diameter of tubular separator 3. It would be possible to cut bottom separator 5 into circular shape, in which case however, there is a lot of loss when cutting out from the paper stock (hoop stock); the area corresponding to this loss is left behind as cutting-out waste, which requires labor to dispose of; cutting into rectangular form is therefore desirable.

Thanks to the above construction, the under-surface of negative electrode gel 4 and the bottom face of battery casing 1 are in a condition separated only by a thin bottom separator 5, so no step (offset condition in the axial direction) is produced in the electromotive reaction surfaces of the positive electrode mixture pellets 2 and negative electrode gel 4, which face each other through tubular separator 3, as shown; furthermore, the receiving capacity for negative electrode gel 4 can be increased, so discharge performance can be improved. Although the raised part 5a of bottom separator 5 is interposed between tubular separator 3 and positive electrode mixture pellets 2, since, as mentioned above, bottom separator 5 consists of ion-permeable film, thanks to ionic conduction, there is no possibility of the electromotive reaction being impeded.

Figure 3:
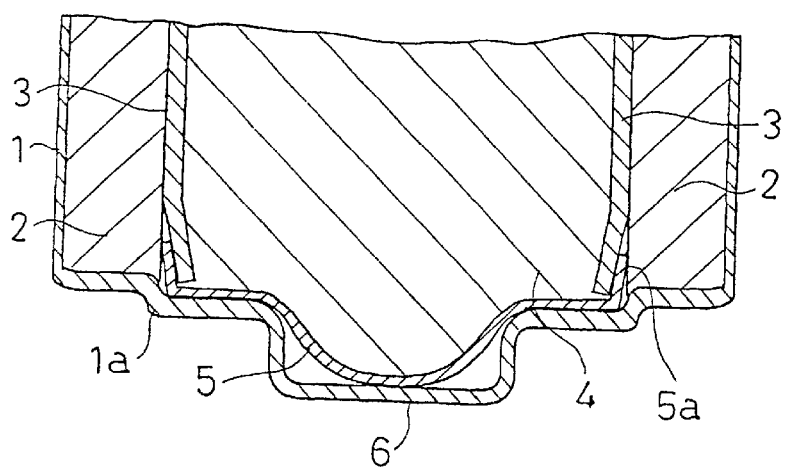
FIG. 3 is a partially sectioned view showing the condition in which expansion has occurred of the negative electrode gel in this battery.

Also, since the thickness of bottom separator 5 is small, at 0.03 to 0.2 mm, and a space formed by positive electrode projection 6 is present at its under-surface, when negative electrode gel 4 expands due to over-discharging, as shown in FIG. 3, expansion of negative electrode gel 4 is absorbed by deformation of bottom separator 5 towards this space. Consequently, liquid leakage due to failure of thin part 7a of sealing plate 7 caused by rise of internal pressure produced by expansion of negative electrode gel 4 can be prevented. If the bottom separator 5 is thicker than 0.2 mm, its action of absorbing expansion of negative electrode gel 4 by means of such deformation is not sufficiently manifested. Also, if it is thinner than 0.03 mm, it is difficult to obtain a uniform thin film, and sufficient strength is difficult to achieve. Thin part 7a is provided with the object of preventing bursting of the battery by releasing internal pressure to the outside by failing when there is an extraordinary rise in internal pressure due to mis-use such as short-circuiting of the battery or inverted insertion and it is undesirable that it should be broken by expansion of negative electrode gel 4. However, the above construction acts effectively in that the under-surface of negative electrode gel 4 is separated from battery casing 1 only by a thin bottom separator 5, so failure of thin part 7a caused by expansion of negative electrode gel is prevented.

Also, since the bottom end of tubular separator 3 is arranged such that it is wrapped from the outside by the raised part 5a at its periphery, this raised part 5a being in a condition in which it is gripped between tubular separator 3 and positive electrode mixture pellets 2, there is no possibility of displacement of bottom separator 5 due to flow of negative electrode gel 4 when subjected to large shocks such as if the battery is dropped or on being subjected to vibration during transportation; as a result, internal short circuits due to leakage of negative electrode gel 4 are prevented.

It should be noted that, although, in this embodiment, battery casing 1 was formed as a positive electrode-integrated type, even in the case of a battery casing of the type wherein the positive electrode terminal is separate, the positive electrode terminal being separately attached covering a raised part in which the casing under-surface projects outwards, since a space is present where this raised part is formed, this can be utilized as a space for absorbing expansion of the negative electrode gel.

Figure 4:
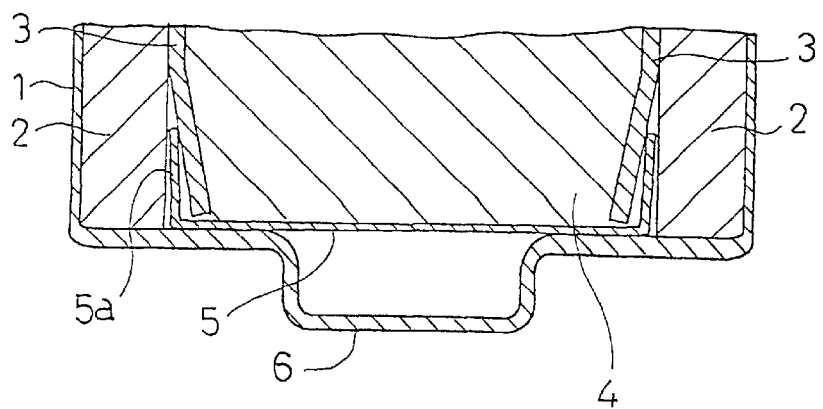
FIG. 4 is a partially sectioned view showing a modified example of the shape of the battery casing of this battery.

As described above, with the construction of the cylindrical battery according to the present invention, no squeezing inwards takes place at the bottom of tubular separator 3 as it does in the case of the conventional construction, so the bottom portion of negative electrode gel 4 is separated from battery casing 1 only by thin bottom separator 5; as a result, a battery casing 1 can be formed without providing a step 1a such as was described in the description of the prior art construction. That is, as shown in FIG. 4, the bottom face of battery casing 1 can be made of a shape without a step 1a, in which only positive electrode projection 6 projects outwards. Even in this case, since bottom separator 5 is thin, no large step is produced in the reaction surfaces where the negative electrode gel 4 and positive electrode mixture pellets 2 face each other.

Next, the construction of a manufacturing device whereby an alkaline dry battery 10 of the above construction is manufactured will be described below with reference to FIG. 5 to FIG. 8.

In FIG. 5A, bottom separator paper 16 prepared as hoop stock of thickness 0.03 to 0.2 mm by laminating non-woven cloth on to both faces of cellophane is pulled out to a cutting position, and punched out by a Thompson mold 17 into a square shape of prescribed dimensions to manufacture bottom separator 5. A bottom separator 5 that has been thus cut out is immediately held by suction by a suction nozzle (bottom separator supply means) 18 and transferred to a separator insertion jig 11, as shown in FIGS. 5B, 5C. Since in this way bottom separators 5 are transferred by suction nozzle 18 immediately after being cut from bottom separator paper 16, even thin bottom separators 5 can be reliably held, one sheet at a time, by suction nozzle 18. Also, since the width of the bottom separator paper stock 16, which is in the form of a tape, is equal to the length of one side of bottom separator 5 that is cut into square shape, there is no loss of material when bottom separator 5 is cut into square shape from this bottom separator paper stock 16, so cutting waste is not produced and the task of disposing of this waste can be eliminated. Furthermore, although the Thompson mold 17 illustrated is of the reciprocatory type, an arrangement could of course be adopted in which a rotary Thompson mold is employed.

Figure 6:
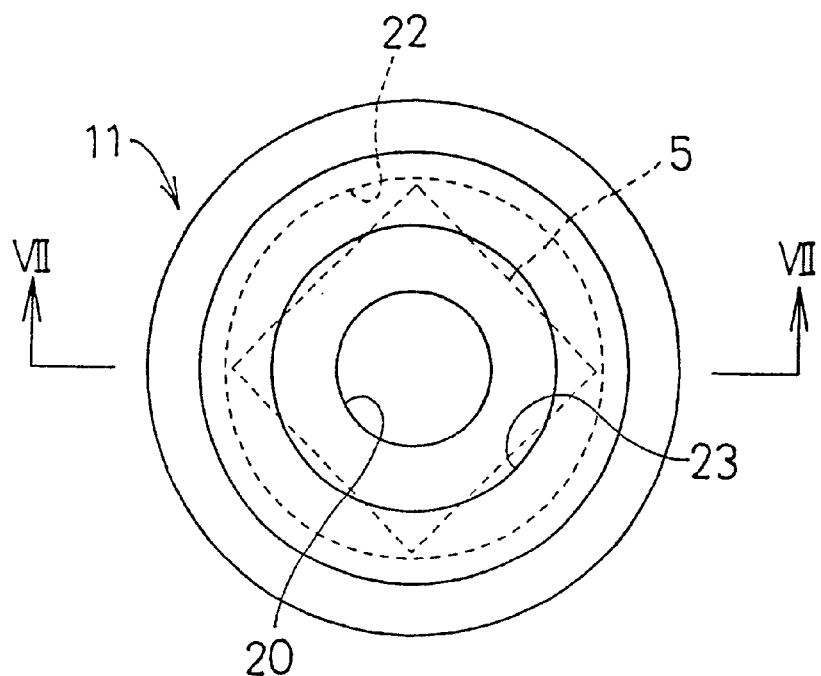
FIG. 6 is a plan view showing the construction of a separator insertion jig in the above manufacturing device.
Figure 7:
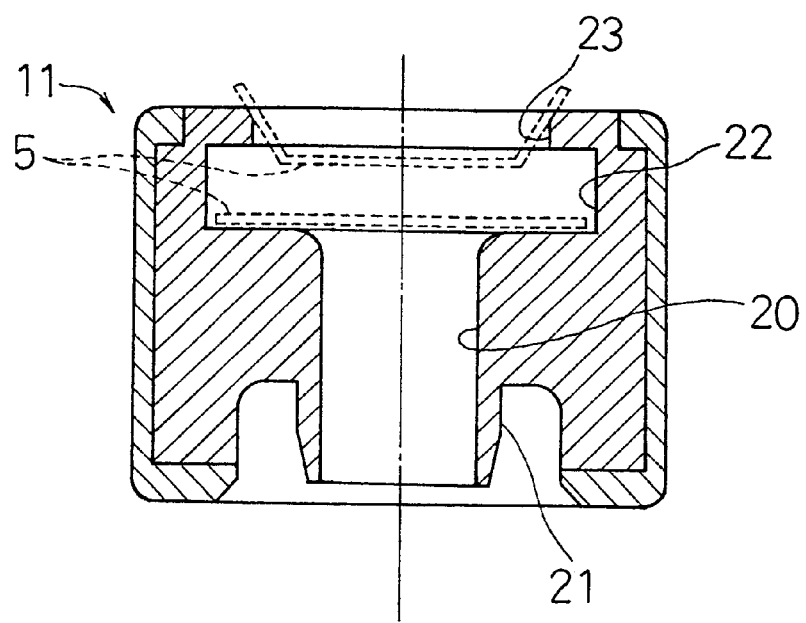
FIG. 7 is a cross-sectional view seen along the line VII—VII of FIG. 6.
Figure 8:
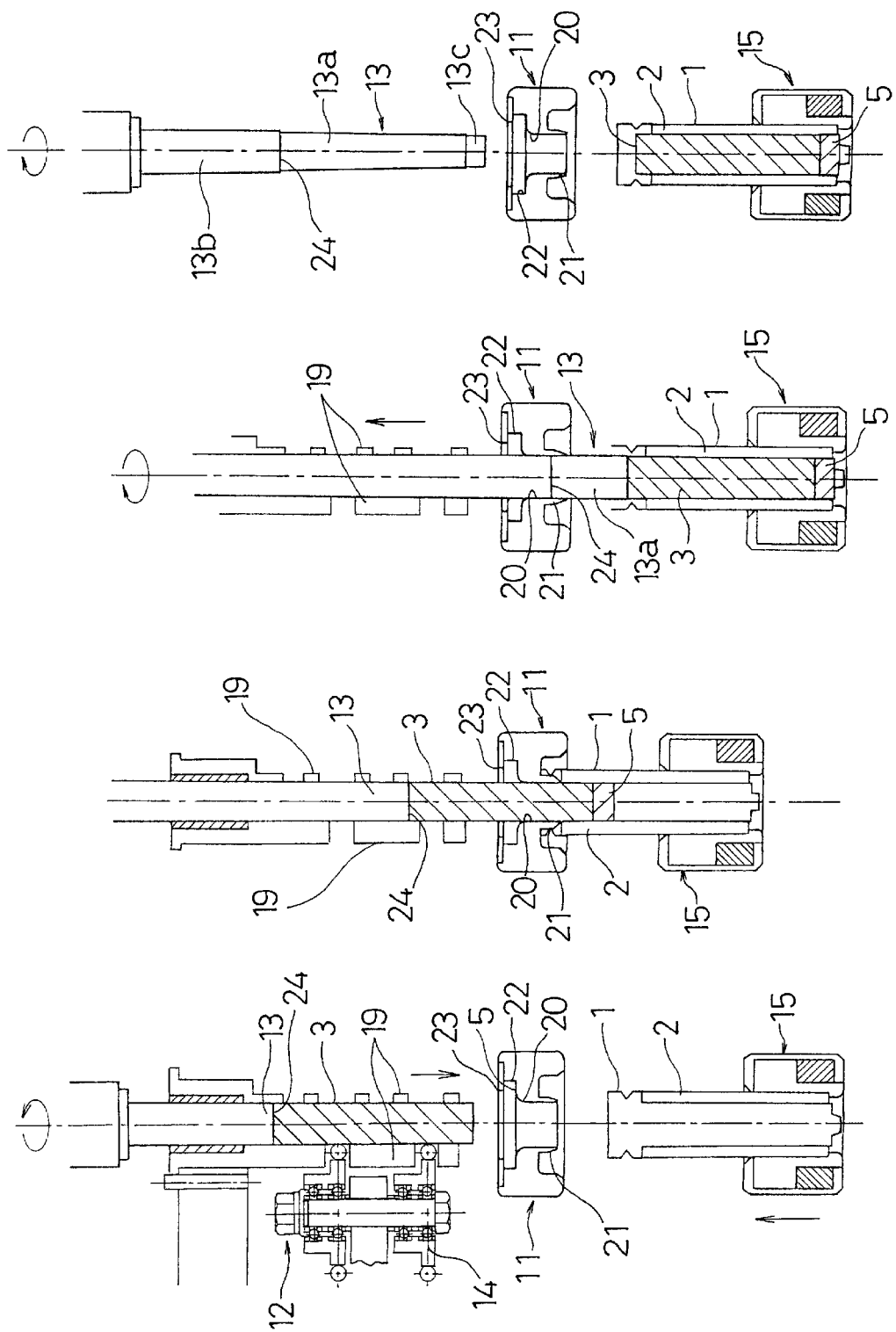
FIGS. 8A–8D are partially sectioned diagrammatic side views showing the sequence of steps of separator insertion in this manufacturing device.
Figure 9:
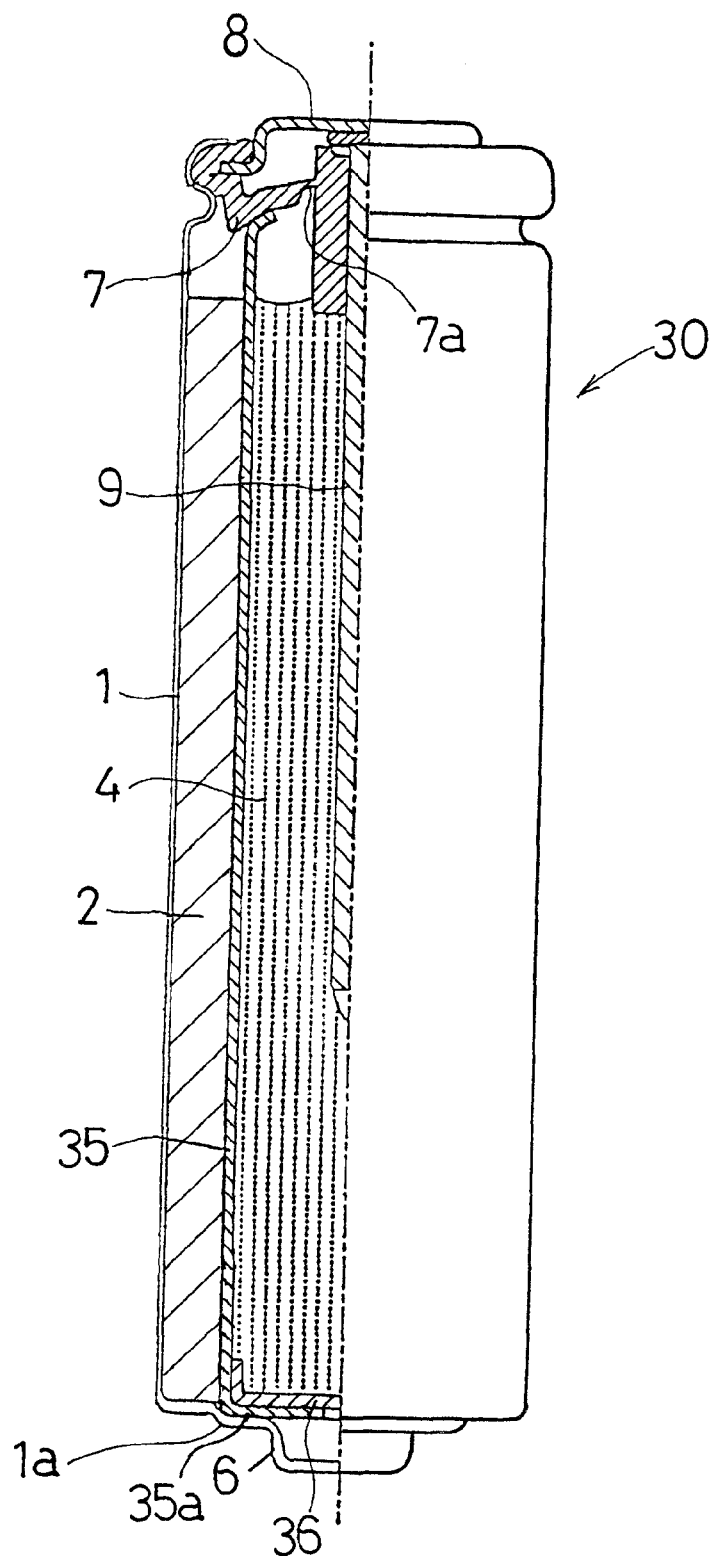
FIG. 9 is a partially sectioned front view showing a prior art construction of an alkaline-manganese dry battery.
Figure 10D:
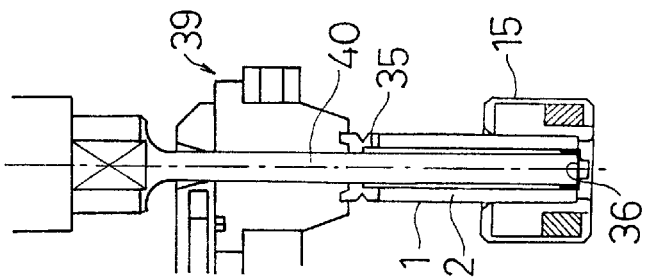
FIGS. 10A–10D are partially sectioned diagrammatic side views showing the sequence of steps of separator installation in a prior art manufacturing device.
Figure 10C:
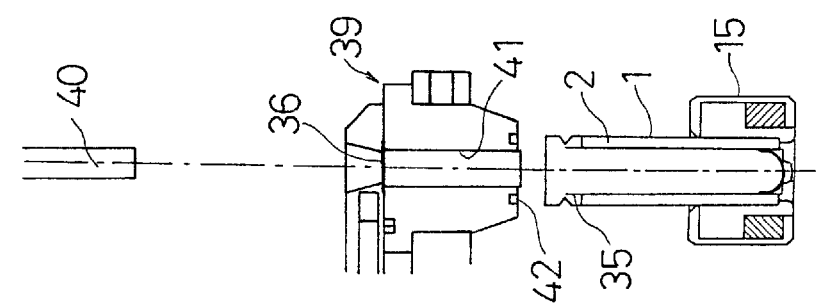
Figure 10B:
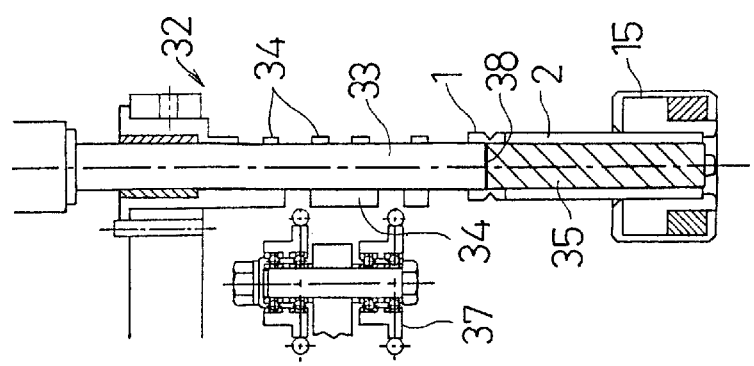
Figure 10A:
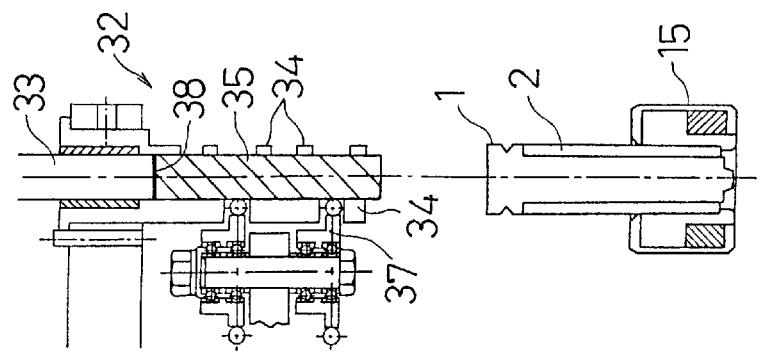

As shown in FIG. 6 and FIG. 7, separator insertion jig 11 has a circular guide hole 20 in a central position and is formed with a cylindrical part 21 at the bottom of guide hole 20, having a diameter such that it can be inserted into the open end of battery casing 1. At the top of guide hole 20, there is provided a holding part 22 having a diameter corresponding to the length of the diagonal of square-shaped bottom separator 5 and defining a space whereby bottom separator 5 can be accommodated in a flat condition. In addition, at the top of holding part 22, there is provided an insertion hole 23 having a diameter shorter than the length of the diagonal of bottom separator 5.

As shown in FIG. 7, when bottom separator 5 held on suction nozzle 18 is inserted into holding part 22 from insertion hole 23, the corners of the square shape are deformed, but, since the accommodating space of holding part 22 has a sufficient height dimension, when inserted into the accommodating space, the corners of this deformed bottom separator 5 can return to the original shape. In this way, a bottom separator 5 that is inserted into the space of holding part 22 assumes a flat condition blocking guide hole 20, and the center of guide hole 20 and the center of bottom separator 5 automatically coincide. Moreover, since the diameter of insertion hole 23 is smaller than the internal diameter of holding part 22, there is no possibility of even a thin and light bottom separator 50 jumping out of holding part 22 or being mis-positioned by vibration or air currents. Consequently, even if separator insertion jig 11 with a bottom separator 5 inserted in holding part 22 is moved, bottom separator 5 is held in stable fashion maintained in the prescribed position.

When bottom separator 5 is transferred, separator insertion jig 11 is moved below separator installation device (separator installation means) 12, as shown in FIG. 8A. Battery feed jig 15 holding a battery casing 1 which has already received in a previous step, not shown, positive electrode mixture pellets 2, is then moved to below this separator insertion jig 11. Separator insertion jig 11 and battery feed jig 15 at this point are located in position such that the respective central axes of separator insertion jig 11 and battery casing 1 coincide with the central axis of winding rod 13 of separator installation device 12.

Separator installation device 12 comprises: a winding rod 13 which is driven in rotation in the forwards and reverse directions, a winding guide 19 arranged with the provision of a gap corresponding to the thickness of the tubular separator 3 between this and the surface of winding rod 13, and a winding roll 14 which roll presses against the tubular separator paper wound on to the winding rod 13 such that no winding slackness is produced. As shown in FIG. 8D, winding rod 13 comprises a base rod 13b and a winding part 13a therebelow on which tubular separator paper is wound, a step 24 being provided at the bottom end of base rod 13b so that the diameter of winding part 13a is formed smaller than the diameter of base rod 13b by an amount corresponding to the thickness of tubular separator 3. Also, a bottom separator installation part 13c having a diameter smaller than the diameter of winding part 13a by an amount corresponding to the thickness of bottom separator 5 is formed at the lower end of winding part 13a.

In FIG. 8A, when tubular separator paper that has been cut to the prescribed dimensions is supplied between winding rod 13 and winding guide 19, tubular separator paper is wound a prescribed number of times whilst winding rod 13 is rotated in the winding direction and winding roll 14 is being pressed against winding rod 13, thereby forming on winding rod 13 a tubular separator 3 in a cylinder shape of prescribed thickness.

Next, winding roll 14 is removed from winding rod 13 and winding rod 13 is lowered. At this point, as shown in FIG. 8B, battery feed jig 15 is raised, so that the cylindrical part 21 of separator insertion jig 11 is inserted into the open end of battery casing 1, which is being held. When winding rod 13, on which tubular separator 3 is wound, passes through the insertion hole 23 of separator insertion jig 11, its tip pushes out the middle portion of bottom separator 5 that is held in holding part 22, causing it to advance within guide hole 20 of separator insertion jig 11. As a result, tubular separator 3 is inserted into battery casing 1 passing through guide hole 20 in a condition with the peripheral portion at its leading end surrounded by the peripheral part of bottom separator 5. Since winding rod 13 is formed with a bottom separator installation part 13c of somewhat smaller diameter at its bottom end, even though the circumferential part of bottom separator 5 surrounds the circumferential part of the leading end of tubular separator 3, the leading end part that is surrounded by bottom separator 5 and the other portions are molded to the same diameter by passage of the leading end of tubular separator 3 through guide hole 20. When tubular separator 3 is inserted into the battery casing, tubular separator 3 is held by winding guide 19 as the winding rod 13 descends, up to the time point where the leading end of tubular separator 3 enters guide hole 20 of separator insertion jig 11, so, right up to the end of the process, no slackening of the winding of tubular separator 3 can occur. Tubular separator 3 that has penetrated into battery casing 1 is pushed by step 24 of winding rod 13 so that it is inserted until bottom separator 5 comes into contact with the bottom face of battery casing 1.

As shown in FIG. 8C, when winding rod 13 descends to the position at which bottom separator 5 contacts the bottom face of battery casing 1, battery feed jig 15 holding battery casing 1 is lowered, while winding rod 13 is raised whilst rotating in the opposite direction to the direction of winding. Due to the reverse rotation of this winding rod 13 and the spring-back of tubular separator 3 itself, tubular separator 3 is separated from winding rod 13 and adheres to the inner circumferential surface of positive electrode mixture pellets 2.

As shown in FIG. 8D, when winding rod 13 is raised to its original position, battery casing 1 in which tubular separator 3 and bottom separator 5 have now been installed is fed to the next step, not shown, by battery feeding jig 15. Also, separator insertion jig 11 moves into the condition shown in FIG. 5B to commence the operation of transferring the next bottom separator 5, and separator installation device 12 commences the operation of winding up the tubular separator 3.

As described above, with the manufacturing device for cylindrical batteries according to the present invention, the tubular separator 3 and bottom separator 5 are installed in battery casing 1 simultaneously, so the steps for insertion of the separators can be unified into a single step; this makes possible improvement in productivity due to reduction in the number of steps and simplification of the manufacturing device.

Industrial Applicability

Since, with a cylindrical battery according to the present invention, a thin bottom separator 5 is employed and squeezing tubular separator 3 inwards at its bottom end is eliminated, the electromotive reaction area where the positive electrode mixture pellets 2 and negative electrode gel 4 face each other can be increased and the amount of negative electrode gel 4 accommodated can be increased, thereby making it possible to improve the discharge performance of the battery. Also, even if the battery is subjected to shock or vibration, bottom separator 5 does not get out of position and furthermore if negative electrode gel 4 expands, this expansion can be absorbed by deformation of the bottom separator, thereby preventing liquid leakage or occurrence of internal short-circuiting and so enabling the reliability of the battery to be improved.

Furthermore, with the manufacturing device for a cylindrical battery according to the present invention, since tubular separator 3 and bottom separator 5 are simultaneously installed in battery casing 1 with the lower end of tubular separator 3 being put in a condition surrounded by raised part 5a of bottom separator 5 from the outside thereof, the steps of installing the separators can be unified into a single step, enabling productivity to be raised and the manufacturing device to be simplified.

What is claimed is:

1. A cylindrical battery comprising:
   a battery casing (1) formed in a cylindrical shape having a bottom and having a projection protruding outwards in the middle of the bottom face;
   positive electrode mixture pellets (2) formed in cylindrical shape and accommodated in said battery casing (1);
   a tubular separator (3) formed in cylindrical shape;
   negative electrode gel (4) accommodated on an inner side of the positive electrode mixture pellets (2) with said tubular separator (3) interposed therebetween;
   a bottom separator (5) arranged at the bottom face on the inside of said battery casing (1); and
   a sealing plate (7) that seals the open end of said battery casing (1);
   wherein said bottom separator (5) is formed in the form of a sheet of thickness less than that of said tubular separator (3) and of dimensions larger than the diameter of tubular separator (3), being arranged such that a peripheral part thereof is raised at the outside of tubular separator (3), thereby isolating said negative electrode gel and the battery casing (1).

2. The cylindrical battery according to claim 1 wherein the thickness of bottom separator (5) is 0.03 to 0.2 mm.

3. The cylindrical battery according to claim 1 wherein bottom separator (5) comprises an ion-permeable sheet.

4. The cylindrical battery according to claim 1 wherein bottom separator (5) is formed in rectangular shape.

5. A method of manufacturing a cylindrical battery that is manufactured by inserting positive electrode mixture pellets (2) formed in cylindrical shape into a cylindrical casing (1) having a bottom, inserting a tubular separator (3) so as to contact the inner circumferential surface of said positive electrode mixture pellets (2), inserting a bottom separator (5) at the bottom face of battery casing (1), injecting a negative electrode gel (4) into the central space enclosed by the two separators (3, 5), and sealing the open end of battery casing (1) by means of a sealing plate (7);
   wherein said bottom separator (5) is formed in the form of a sheet of dimensions larger than the diameter of tubular separator (3) and both separators (3) and (5) are inserted simultaneously into battery casing (1) with the leading end of tubular separator (3) in contact with this bottom separator (5), thereby inserting both separators (3, 5) into the battery casing with the peripheral portion of bottom separator (5) raised so that the leading end of tubular separator (3) is surrounded from the outside by the raised portion at the periphery of said bottom separator (5).

6. A device for manufacturing a cylindrical battery whereby a cylindrical battery is manufactured by inserting positive electrode mixture pellets (2) formed into cylindrical shape into a cylindrical battery casing (1) having a bottom, then inserting a tubular separator (3) so as to contact the inside circumferential face of said positive electrode mixture pellets (2) and inserting a bottom separator (5) on to the bottom face of battery casing (1), and injecting a negative electrode gel (4) into the central space enclosed by separators (3, 5), comprising:
   a separator insertion jig (11) including a circular guide hole (20) along whose central axis a tubular separator (3) is passed, a cylindrical part (21) which is below this guide hole (20) and that can be inserted into the open end of battery casing (1), and a holding part (22) that is above said guide hole (20), for holding bottom separator (5);
   bottom separator supply means (18) whereby a bottom separator (5) cut to dimensions larger than the diameter of tubular separator (3) is supplied into holding part (22) of said separator insertion jig (11); and
   separator installation means (12) having a winding rod (13) and whereby a tubular separator (3) is formed by winding separator paper on to this winding rod (13), and whereby this tubular separator (3) is inserted into battery casing (1) through said guide hole (20) together with the bottom separator (5) held within holding part (22) of said separator insertion jig (11);

wherein separator insertion jig (11) to which the bottom separator (5) has been supplied from said bottom separator supply means (18), the winding rod (13) of the separator installation means (12) on which a tubular separator (3) has been formed, and the battery casing (1) into which the positive electrode mixture pellets (2) have been inserted are positionally located such that their respective central axes coincide with an identical line; the cylindrical part (21) of the separator insertion jig (11) is fitted onto the open end of the battery casing (1); and said separator insertion jig (11), winding rod (13), and battery casing (1) are relatively moved such that the winding rod (13) is inserted into the battery casing (1) through said guide hole (20) and is then once more returned to said positionally located condition, whereby the tubular separator (3) and the bottom separator (5) are simultaneously installed in the battery casing (1).

7. The device for manufacturing a cylindrical battery according to claim 6 wherein the bottom separator supply means (8) is constructed such that, immediately after a bottom separator (5) has been cut from paper, said bottom separator (5) is transferred to the separator insertion jig (11) by being held by vacuum suction.

8. The device for manufacturing a cylindrical battery according to claim 6 wherein the bottom separators (5) are cut into square shape from paper.

9. The device for manufacturing a cylindrical battery according to claim 6 wherein said separator insertion jig (11) further comprises an insertion hole (23) of aperture diameter shorter than the length of the diagonal of bottom separator (5) that has been cut into square shape, and said holding part (22) is formed with a circular accommodating space whose internal diameter is of practically the same length as the diagonal length of bottom separator (5) that has been cut to square shape.

* * * * *